United States Patent [19]
Masumura et al.

[11] 3,995,300
[45] Nov. 30, 1976

[54] REDUCTION-REOXIDATION TYPE SEMICONDUCTING CERAMIC CAPACITOR

[75] Inventors: Hitoshi Masumura; Shinobu Fujiwara; Hitoshi Tanaka, all of Tokyo, Japan

[73] Assignee: TDK Electronics Company, Limited, Tokyo, Japan

[22] Filed: Aug. 14, 1974

[21] Appl. No.: 497,333

[52] U.S. Cl. ............... 357/10; 106/73.2; 106/73.3; 357/14
[51] Int. Cl.² ............... H01L 29/95; H01G 4/12
[58] Field of Search ............ 252/62.3 BT, 520; 357/10, 14; 317/230; 106/46, 73.3

[56] References Cited
UNITED STATES PATENTS

| | | |
|---|---|---|
| 3,069,276 | 12/1962 | Domanski .................. 106/73.3 |
| 3,499,772 | 3/1970 | Fujiwara et al. .............. 106/73.3 |
| 3,673,119 | 6/1972 | Ueoka et al. ................. 357/10 |

*Primary Examiner*—William D. Larkins
*Attorney, Agent, or Firm*—Burgess, Ryan and Wayne

[57] ABSTRACT

An improved reduction-reoxidation type semiconducting ceramic capacitor and the method for producing the same are disclosed. The main components of the substrate of the capacitor are $CaTiO_3$, $SrTiO_3$ and $Bi_2O_3 \cdot xTiO_2$. Said substrate also contains at least one member selected from the group consisting of manganese, cobalt, nickel, chromium, vanadium, niobium, tantalum, lanthanum and cerium ions in total amounts of 0.025 to 0.4% by weight. The capacitor according to the present invention excels, in the temperature independency of the capacitance and tan δ, etc.

2 Claims, 6 Drawing Figures

REDUCTION-REOXIDATION TYPE SEMICONDUCTING CERAMIC CAPACITOR

BACKGROUND OF THE INVENTION

The present invention relates to $SrTiO_3$-$CaTiO_3$-$Bi_2O_3 \cdot xTiO_2$ type semiconducting ceramic capacitors, particularly the capacitors which are suitable for use in circuits demanding severe temperature properties, such as a coupling or a trap circuit. In according with this invention, the ceramic capacitors are prepared from compositions consisting predominantly of the nonstoichiometric solid solutions which are derived from a mixture composed mainly of strontium titanate ($SrTiO_3$), calcium titanate ($CaTiO_3$), bismuth oxide ($Bi_2O_3$) and titanium oxide ($TiO_2$) and in which minor proportions of suitable amounts of at least one member selected from the group consisting of manganese, cobalt, nickel, chromium, vanadium, niobium, tantalum, lanthanum and cerium ions are added thereto. This mixture is then fired in an oxidizing atmosphere to produce a ceramic and the resulting ceramic is heated in a reducing atmosphere and some amount of oxygen eliminated therefrom to produce the nonstoichiometric solid solutions. The resulting nonstoichiometric solid solutions are partially re-oxidized in an oxidizing atmosphere at elevated temperature to produce the semiconducting ceramic capacitors.

Although semiconducting ceramic capacitors are a relatively new field of technology, it is now recognized they they are superior to conventional insulating ceramic capacitors since they exhibit a large capacitance, are small in size and relatively compact, and exhibit other excellent characteristics. Semiconducting ceramic bodies for use as capacitors are classified into two types, viz, the valence control type and the reduction-reoxidation type, according to their composition and the method of their production. The semiconducting ceramic bodies of the valence control type are composed predominantly of barium titanate to which minor amounts of other elements, which have an ionic radius similar to those of the constituents of barium titanate but with a different valency, are added thereto. Since the characteristics of these valence control type semiconductors are strongly affected by the purity of raw materials, the maintenance of said purity during the manufacturing process, and the necessity of accurately weighing the raw materials in order to combine them in suitable proportions, make it difficult, if not impossible, to produce such ceramics on an industrial scale. In fact, it is difficult to prepare such ceramics in the laboratory, let alone on an industrial scale. In addition, the valence control type semiconductors have other defects in that their specific resistivity cannot be lowered below 10 ohm-cm, and their electrical properties are intrinsically fixed so that the temperature dependence of their capacitance cannot be changed arbitrarily.

On the other hand, the capacitors made from ceramics of the reduction-reoxidation type are free of the defects peculiar to the valence control type ceramics but have other difficulties. For example, capacitors of this type, generally have such defects that the insulation resistance shows a sharp fall when the applied voltage is increased and, therefore, their working voltage in usual practical applications is generally 10 volts and the upper limit is fixed at about 12 volts. Another shortcoming of these capacitors is that undesirable changes of the electrical properties occur when lead wires are directly soldered to silver electrodes because it is difficult to stabilize the barrier layers. To prevent this, lead wires are usually attached to the silver electrodes with conductive adhesives. But in practical use, when said capacitors are connected in a circuit, their lead wires are heated to an elevated temperature during the soldering processes, which sometimes leads to damage of the conductive adhesives. Particularly in miniaturized electric circuits, in which lead wires are short, very careful treatment is needed.

In short, the prior semiconducting ceramic capacitors, the main constituent of which is barium titanate ($BaTiO_3$), possess no electrical properties of barium titanate, that is, its temperature independency of the capacitance and tan δ, and the high dielectric constant.

Further, because of their low breakdown voltage, these capacitors have been limited in their utility as stated above.

SUMMARY OF THE INVENTION

It is an object of the present invention to provide semiconducting ceramic capacitors free from the aforementioned defects and which ceramic capacitors exhibit a much lower tan δ, a better temperature independency of tan δ and capacitance C and a higher breakdown voltage than those of conventional semiconducting ceramic capacitors.

A further object of the invention is to provide semiconducting ceramic capacitors excellent in the bias characteristics frequency characteristics and aging characteristics of capacitance and tan δ.

A still further object of the invention is to provide semiconducting ceramic capacitors having stable barrier-capacitive layers formed from a reduction-reoxidation process in which lead wires can be directly soldered to silver electrodes without deterioration of any electrical properties or damage to the electrode connection areas, that is their characteristics to thermal shock are improved, whereby working efficiency may be extremely enhanced in the manufacturing process of capacitors or in the assembling process of electric circuit parts using capacitors.

In accordance with the present invention, the semiconducting ceramic capacitors having such excellent properties may be obtained from the ceramic compositions having the composition falling within the tetragonal area A-B-C-D formed by the compositional points A, B, C and D indicated in the following Table I in which at least one member selected from the group consisting of Mn, Co, Ni, Cr, V, Nb, Ta, La and Ce ions is added thereto.

Table I

| Point | $CaTiO_3$ | $SrTiO_3$ | $Bi_2O_3 \cdot xTiO_2$ |
| --- | --- | --- | --- |
| A | 98.0 wt.% | 0 wt.% | 2.0 wt.% |
| B | 0 | 98.0 | 2.0 |
| C | 0 | 50.0 | 50.0 |
| D | 50.0 | 0 | 50.0 |

Usually, in accordance with conventional processes for the production of semiconducting ceramics the use of high purity raw materials is essential which, however, increases the manufacturing cost.

In accordance with the present invention, there has been developed semiconducting ceramic capacitors which are excellent in electrical properties but which are produced at a considerably reduced manufacturing cost by using ordinary industrial raw materials.

The semiconducting ceramic capacitors of this invention may be prepared by the following procedures.

$SrTiO_3$, $CaTiO_3$, $Bi_2O_3$, $TiO_2$ and one or more members selected from the group consisting of Mn, Co, Ni, Cr, V, Nb, Ta, La and Ce ions are weighed in such amounts as to give a desirable composition. They are placed in a porcelain pot on a trommel and mixed together.

The resulting raw material mixture is mixed with binders. The obtained mixture is pressed and shaped into disks and the like. The shaped bodies are sintered in an oxidizing atmosphere to produce ceramics, and afterwards, the ceramic bodies are fired again in a reducing atmosphere. In the latter process, the ceramic bodies lose some amount of oxygen and become semiconductive. Then, the semiconductive ceramic bodies thus obtained are equipped with silver electrodes and fired in an oxidizing atmosphere. This final heat treatment serves for the plating of the silver electrode, the surface diffusion of the electrode materials on the body and partial reoxidation of the ceramic bodies at the same time, whereby semiconducting ceramic capacitors are obtained. All of the processes described above are included in the manufacturing method of the semiconducting capacitors of this invention and are indispensable to provide ceramic bodies with the features and properties described.

The raw materials usable for the present invention may be oxides or compounds which give oxides by heating like carbonates, nitrates, hydroxides, hydrates and so forth.

The manganese ions may be added as manganese carbonate, sulfate, nitrate, hydroxide or manganese salts of organic acids.

BRIEF DESCRIPTION OF THE DRAWINGS

The invention will be further illustrated in conjunction with the annexed drawings, in which.

DETAILED DESCRIPTION OF THE PREFERRED EMBODIMENTS

The raw materials are combined and mixed so as to give the composition: $SrTiO_3$ 66.0 wt.%, $CaTiO_3$ 27.0 wt.%, $Bi_2O_3 \cdot 3TiO_2$ 7.0 wt.% and Mn ions 0.05 wt.%.

The resulting materials are wet mixed in a porcelain pot using agate balls. The $SrTiO_3$ and $CaTiO_3$ are prepared in advance from combinations of strontium carbonate ($SrCO_3$) and titanium dioxide ($TiO_2$), and calcium carbonate ($CaCO_3$) and titanium dioxide ($TiO_2$), respectively, by calcining the equimolar mixture at a temperature of 1200° C and subsequently roughly crushing the calcined mixture.

The Mn ions were added as manganese carbonate.

After wet mixing, binders are added to the mixture and sufficiently mixed in a ball mill. The obtained mixture is pressed and shaped into disks of a diameter of 16.5 mm and of a thickness of 0.6 mm under a pressure of 3 ton/cm².

The shaped bodies are sintered at 1350° C in air for 2 hours, and afterward fires again at 850° C in a reducing atmosphere, e.g. a hydrogen gas flow for 1 hour. In the latter treatment, the ceramic bodies loses some amount of oxygen and becomes semiconductive. Then, both surfaces of the obtained semiconductive ceramic bodies are painted with silver electrode paste. These ceramic bodies are heated in an oxidizing atmosphere, e.g., air, at 780° C to effect partial reoxidation of the ceramic bodies and thus the painted silver electrode material is plated on the faced of the ceramic bodies. Finally, lead wires are directly soldered on the surface of silver electrodes by immersing them in fused solder. The characteristic values of the semiconducting ceramic capacitors thus obtained are as follows:

| | |
|---|---|
| Capacitance per unit area | 0.04 $\mu F/cm^2$ |
| Tan $\delta$ | 0.5% |
| Rate of change in capacitance at a temperature of −55 and +120° C based on the capacitance at 20° C | −55° C; +6.2% +120° C; −5.6% |
| Insulating resistance (IR) (measured at DC 100 V and 60 seconds) | 5 × 10⁴ M $\Omega$ |
| Breakdown voltage | 800 $V_{DC}$ |

In the above-mentioned measurement, the values measured 24 hours after the reoxidation are taken as the initial values and both the capacitance (C) and the dielectric loss (tan $\delta$) are measured at a frequency of 1 KHz, a voltage of 1 v and a temperature of 25° C.

Figure 1:
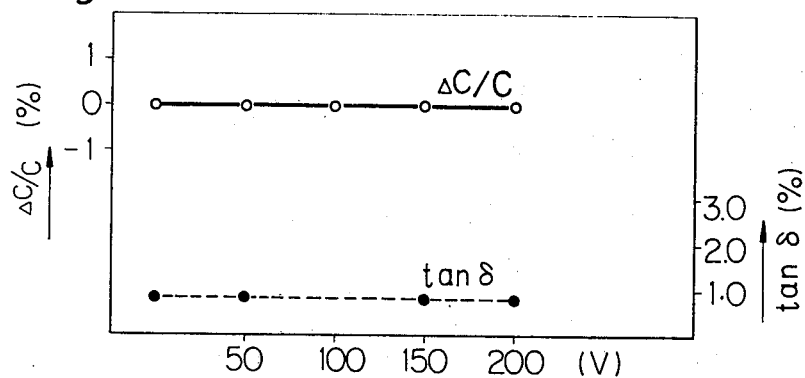
FIG. 1 graphically shown the variation of the capacitance and tan $\delta$ of semiconducting ceramic capacitors when the D.C. voltage is applied.
Figure 2:
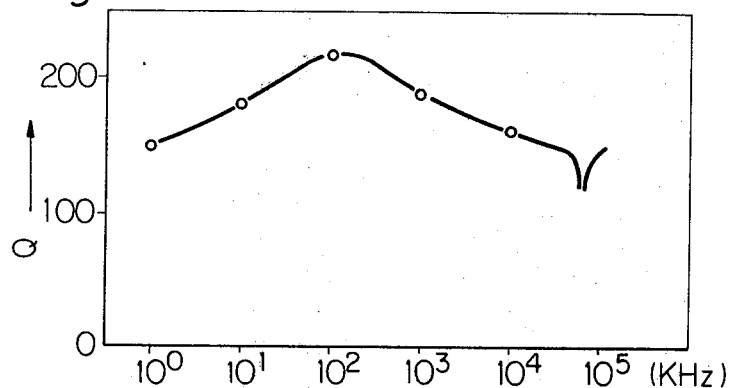
FIG. 2 illustrates the relationship between the variation of tan $\delta$ and the applied frequency for semiconducting ceramic capacitors.
Figure 3:
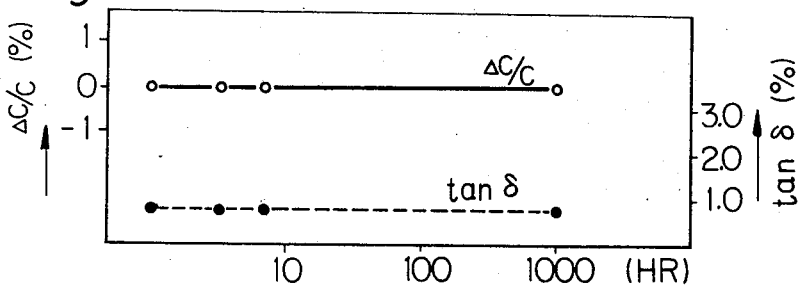
FIG. 3 graphically shows the aging dependence of capacitance and tan $\delta$, respectively, of semiconducting ceramic capacitors.

Further, the variation of the capacitance and tan of the semiconducting ceramic capacitors in which the D.C. voltage was applied is shown in FIG. 1 and the frequency characteristics of the tan $\delta$ of the semiconducting ceramic capacitors are shown in FIG. 2. Also, the aging characteristics of the capacitance and tan $\delta$ of the semiconducting ceramic capacitors are illustrated in FIG. 3, where the horizontal axis shows the time (in hours).

From FIG. 1, it is apparent that no variation in the capacitance and tan $\delta$ occurs although the D.C. voltage is applied. As seen in FIG. 2, the semiconducting ceramic capacitors exhibit a quantity of electricity Q not less than 100 (the tan $\delta$ is not greater than 1%) at a frequency in the range of from 1 KHz to 10 MHz. Also, as seen from FIG. 3, the values of the capacitance and tan $\delta$ are identical to their initial values even after the lapse of 1000 hours.

Table II shows the electric properties of the conventional reduction-reoxidation type $BaTiO_3$ semiconducting ceramic capacitors and the semiconducting ceramic capacitors according to the present invention.

Table II

| No. | Specimen | C ($\mu$F/cm$^2$) | tan$\delta$ (%) | IR (M$\Omega$) | ($V_{DC}$) | T.C. (%) at a temperature of $-30°$ C and $+85°$ C | Bias characteristics (%) |
| --- | --- | --- | --- | --- | --- | --- | --- |
| 1 | BaTiO$_3$-Bi$_2$O$_3$ | 0.18 | 5.4 | 2 × 10$^3$ | 500 | $-8$ — $-25$ | $-40$ |
| 2 | BaTiO$_3$-La$_2$O$_3$ | 0.17 | 2.0 | 1 × 10$^5$ | 1200 | $-29$ — $-67$ | $-40$ |
| 3 | Invention | 0.04 | 0.5 | 5 × 10 | 800 | $+4$ — $-1$ | 0 |

T.C. in the above table is a value calculated from the following relationship.

$$T.C.\ (\%) = \Delta C/C_{20} \times 100 = (C_x - C_{100})/100$$

where $C_x$ is the capacitance at $x°$ C (in this case, $x$ is $-30°$ C and $+85°$ C), and $C_{20}$ is the capacitance at 20° C.

Figure 4:
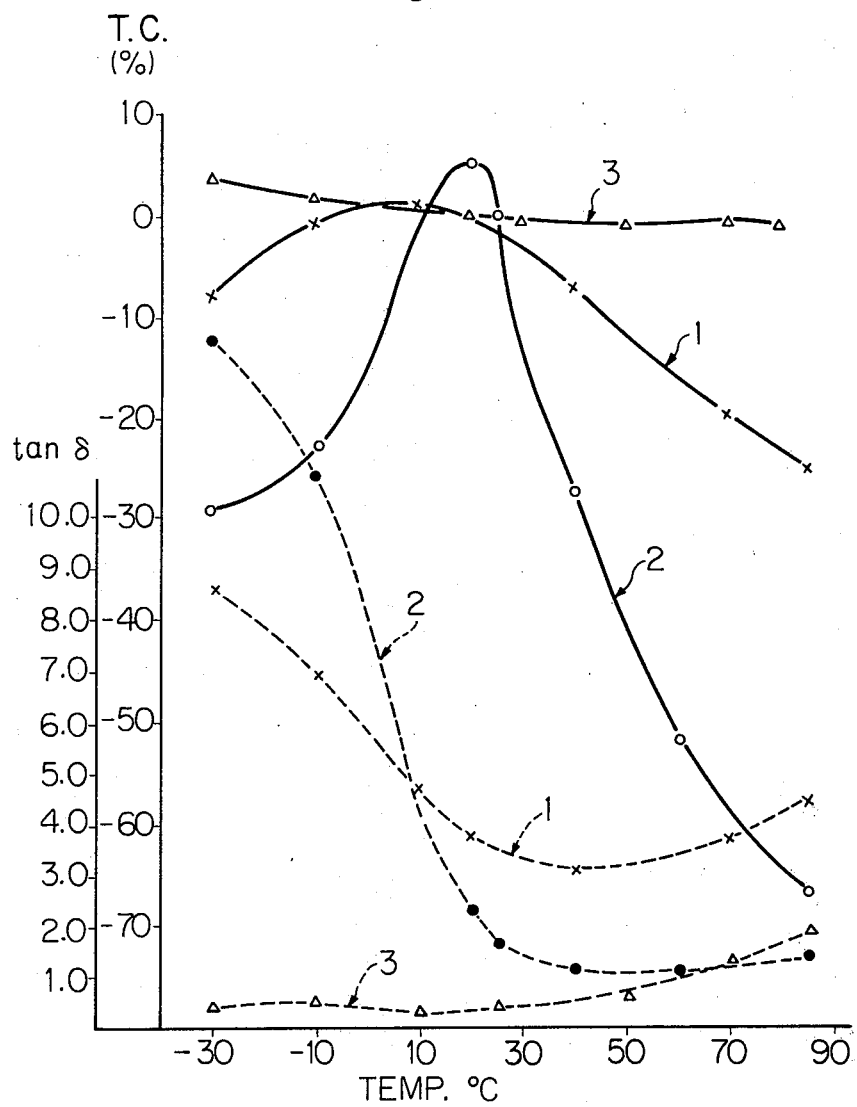
FIG. 4 depicts the temperature dependence of capacitance and tan $\delta$, respectively, of semiconducting ceramic capacitors.

FIG. 4 shows the temperature dependence of the capacitance (C) and tan $\delta$ of the samples indicated in Table II. In FIG. 4, a solid line represents T.C. (%), while a dotted line represents tan $\delta$ and numbers 1, 2 and 3 in FIG. 4 correspond to those in the Table II. From Table II and FIG. 4, it is apparent that the semiconducting ceramic capacitors of the present invention are far more excellent in tan $\delta$ and T.C. (%) than the conventional semiconducting ceramic capacitors. also, Table II and FIGS. 1, 2 and 3 clearly demonstrate that the bias characteristics, frequency characteristics and aging characteristics of the semiconducting ceramic capacitor of the present invention are all excellent.

As can be seen from the foregoing, the present invention provides semiconducting ceramic capacitors which suffer from no disadvantages encountered in the conventional reduction-reoxidation type BaTiO$_3$ semiconducting ceramic capacitors and are very stable in temperature, voltage, frequency and aging characteristics and thus useful for use in electronic circuits.

In the above Table II, the specimen No. 1 is measured at a voltage of 0.5 v and a frequency of 1 KHz for the tan $\delta$ and T.C. (%) and the IR is measured at a voltage of 25 V. Further, the bias characteristic is a rate of change in capacitance when a D.C. voltage of 25 V is applied. The specimen No. 2 is determined at a voltage of 1 V and a frequency of 1 KHz for the tan $\delta$ and T.C. (%), and the IR is determined at a voltage of 50 V. Further, the bias characteristic is a rate of change in capacitance when a D.C. voltage of 50 V is applied.

Also, the specimen No. 3 according to the present invention is determined under the same conditions as those used in determining the specimen No. 1.

Table III below, shows the data of electrical properties obtained by varying the amount of Mn ion in the aforementioned composition, which represents the effect of the added Mn ions.

Table III

| No. | Mn ion (wt.%) | C ($\mu$F/cm$^2$) | tan $\delta$ (%) | IR (M$\Omega$) | V ($V_{DC}$) |
| --- | --- | --- | --- | --- | --- |
| 4 | 0 | 0.040 | 21 | 1 × 10$^4$ | 250 |
| 5 | 0.025 | 0.044 | 0.7 | 1 × 10$^4$ | 600 |
| 6 | 0.05 | 0.040 | 0.5 | 5 × 10$^4$ | 800 |
| 7 | 0.15 | 0.034 | 0.4 | 5 × 10$^4$ | 1200 |
| 8 | 0.40 | 0.021 | 0.4 | 7 × 10$^4$ | 1600 |
| 9 | 0.60 | 0.0007 | 0.1 | $\infty$ | 7000 |

As seen from Table III, the addition of Mn ions, even in a small amount, brings a rapid increase in the insulation resistance IR. This increase is caused by the lowering of the conduction electron density in the barrier layer owing to the valency compensation effect of Mn ions in the barrier.

In Table III, manganese carbonate (MnCO$_3$) is used as a source of Mn ions and is added in such amounts as to give a predetermined content of Mn ions.

In the case where the amount of added Mn ions is less than 0.025 wt. %, the ceramic bodies produced have spots and pinholes on their surface, do not have fine surfaces and, further, exhibit a large variation in characteristic values. On the other hand, when the amount of the added Mn ions exceeds 0.60 wt.%, the capacitance becomes quite small, although the insulation resistance is high. This is because the reoxidation phenomenon during the reoxidation process becomes violent, and results the deterioration of the semiconducting capacitors.

Figure 6:
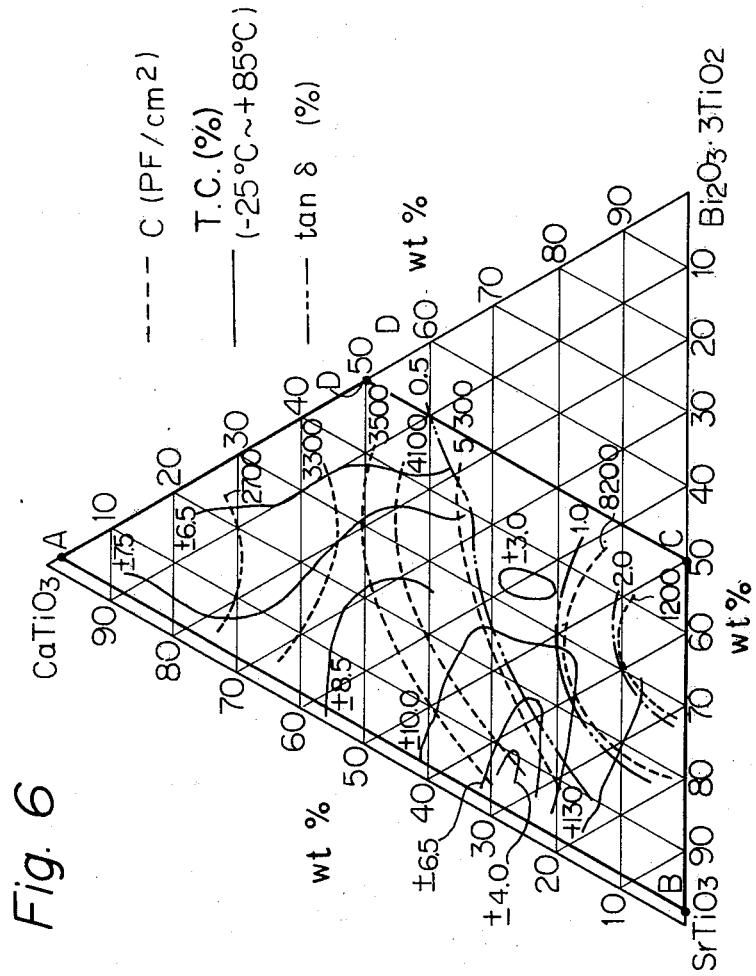
FIG. 6 is a triangular compositional diagram of the ternary system $CaTiO_3$-$SrTiO_3$-$Bi_2O_3 \cdot 3TiO_2$ in which the contour lines of capacitance, T.C.(%) and tan $\delta$ are respectively depicted.

The effect of the addition of Mn ions described above in similar at any part of the composition region A-B-C-D depicted in FIG. 6. Consequently, the amount of Mn ions to be added is limited within the range from 0.025 to 0.40 wt.%

Other experiments indicate that the addition of Co, Ni, Cr, V, Nb, Ta, La and Ce ions, rather than Mn ions, each provide entirely similar results to those obtained with Mn ions and that the combined addition of two or more ions selected from these ions may provide good semiconducting ceramic capacitor, the characteristics of which are the same as that of the present invention, provided that the total amount of the added ion is within the range from 0.025 to 0.40 wt.%.

Figure 5:
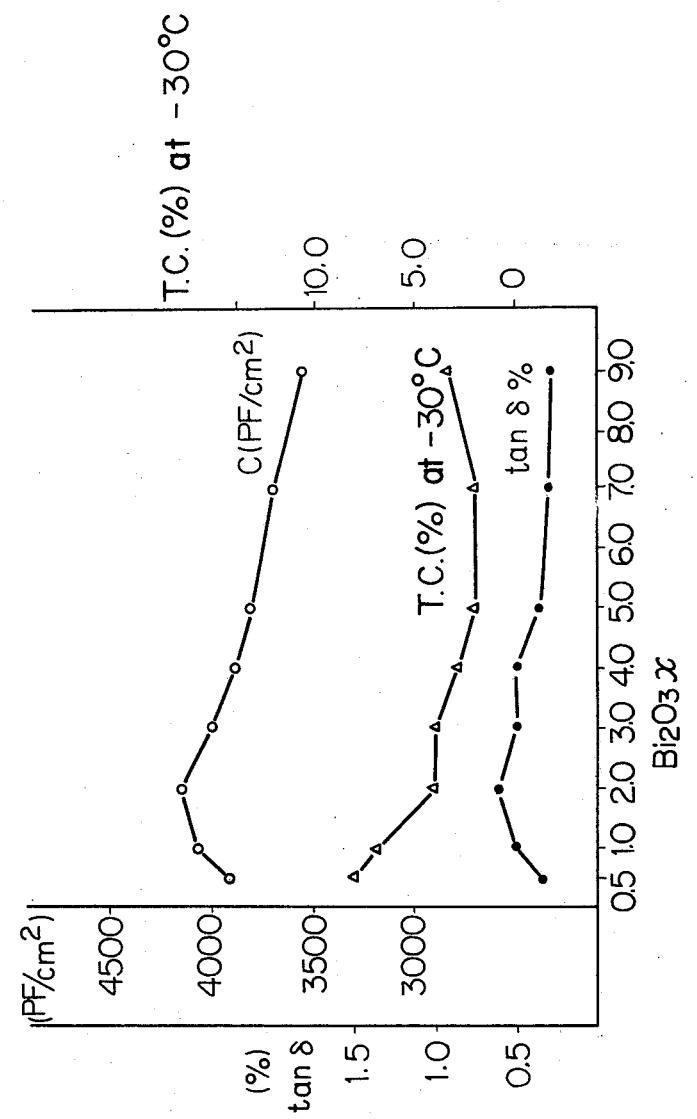
FIG. 5 illustrates the relationship between the variation of capacitance, T.C.(%) and tan $\delta$ and the value of $x$ in the $Bi_2O_3 \cdot xTiO_2$ component for semiconducting ceramic capacitors.

FIG. 5 graphically illustrates the relationship between the variation of capacitance (C), the rate of temperature dependency in capacitance measured at $-30°$ C and tan $\delta$, vs. the value of $x$ in Bi$_2$O$_3$.$x$TiO$_2$, which is one of the main components of the ceramic composition according to the present invention.

In the case where $x$ is less than 0.5, the Bi$_2$O$_3$ becomes excessive in amount and the resulting composition is outside the mentioned composition region due to the volatilization of Bi$_2$O$_3$ during firing, which brings an undesirably violent variation in characteristics for practical purposes. On the other hand, when $x$ is greater than 9.0, the TiO$_2$ becomes excessive and the ceramic bodies adhere to each other.

In the case where $x$ is in the range from 0.5 to 9.0, as shown in FIG. 5, the resulting semiconducting ceramic capacitors exhibit good capacitance, T.C. (%) and tan $\delta$ characteristics. Accordingly, in the formula Bi$_2$O$_3$.$x$TiO$_2$, the preferred values of $x$ are within the range from 0.5 to 9.0.

Additionally, in FIG. 5, the values of $x$ in $Bi_2O_3.xTiO_2$ were varied with the ceramic composition consisting of $SrTiO_3$ 66.0 wt. %, $CaTiO_3$ 27.0 wt.%, $Bi_2O_3.xTiO_2$ 7.0 wt.% and Mn ions 0.05 wt.%.

FIG. 6 shows the contour lines of capacitance (C), T.C. (%) at a temperature of −25° C to 85° C and tan δ of the semiconducting ceramic capacitors prepared from the composition as previously stated with the variable of three elements, $SrTiO_3$, $CaTiO_3$ and $Bi_2O_3.3TiO_2$.

As is also seen from FIG. 6, the semiconducting ceramic capacitors are excellent in T.C. (%) and tan δ properties. The excellent properties can be attained by the ceramic compositions falling within the tetragonal area A-B-C-D in FIG. 6 in which 0.025 to 0.4 wt.% of at least one member selected from the group consisting of manganese, cobalt, nickel, chromium, canadium, niobium, tantalum, lanthanum and cerium ions, is added thereto. That is, the semiconducting ceramic capacitors having excellent properties may be obtained from the ceramic compositions having the composition falling within the tetragonal area A-B-C-D formed by the compositional points A, B, C and D indicated in Table IV, below, in which at least one member selected from the group consisting of Mn, Co, Ni, Cr, V, Nb, Ta, Lz and Ce ions is added thereto.

Table IV

| Point | $CaTiO_3$ | $SrTiO_3$ | $Bi_2O_3 . xTiO_2$ |
|---|---|---|---|
| A | 98.0 wt.% | 0 wt.% | 2.0 wt.% |
| B | 0 | 98.0 | 2.0 |
| C | 0 | 50.0 | 50.0 |
| D | 50.0 | 0 | 50.0 |

In FIG. 6, the value of $x$ in the $Bi_2O_3.xTiO_2$ is equal to 3, but this is only one representative example. The semiconducting ceramic capacitors obtained from the ceramic compositions in which the values of $x$ in the $Bi_2O_3. xTiO_2$ range from 0.5 to 9.0 exhibit the same excellent properties as those obtained by the ceramic bodies in which the value of $x$ in the $Bi_2O_3.xTiO_2$ is 3, as is shown in FIG. 5.

In the case where the amount of the $Bi_2O_3.xTiO_2$ is less than 2.0 wt.% in the ceramic bodies according to the present invention, it is difficult to cause the oxygen contained in the ceramic bodies to liberate even if the ceramic bodies are subjected to heat treatment in a reducing atmosphere, whreby they are not rendered semiconductive. This indicates that reduced amounts of bismuth inhibit a smooth liberation of oxygen and reoxidation. On the other hand, when the amount of the $Bi_2O_3.xTiO_2$ is more than 50.0 wt.%, it is difficult to sinter the shaped bodies which is disadvantageous from the practical point of view.

Accordingly, the preferred amount of the $Bi_2O_3.xTiO_2$ is in the range from 2.0 to 50.0 wt.%. The amount of $CaTiO_3$ and $SrTiO_3$ corresponds to the remainder from which the $Bi_2O_3.xTiO_2$ is removed. In other words, the amount of the $CaTiO_3$ is in the range from 0 to 98 wt.%. In this case, when the $CaTiO_3$ is 0 wt.%, the $SrTiO_3$ amounts to 98 wt.%, while when the $CaTiO_3$ is 98 wt.%, the $SrTiO_3$ amounts to 0 wt.%. The $CaTiO_3$ and $SrTiO_3$ are added in a weight ratio such that the desirable characteristics of C, tan δ and T.C. (%) may be obtained.

In the case where the total amount of the $SrTiO_3$ and $CaTiO_3$ is less than 50 wt.%, sintering becomes difficult because of the increased amount of the $Bi_2O_3.xTiO_2$ which is disadvantageous from the practical point of view. On the other hand, when the total amount of the $SrTiO_3$ and $CaTiO_3$ is more than 98 wt.%, the amount of the $Bi_2O_3.xTiO_2$ is below 2 wt.% which makes it difficult to liberate the oxygen contained in the ceramic bodies by heat treatment in a reducing atmosphere, whereby the ceramic bodies are not rendered semiconductive.

As previously described in detail, the semiconducting ceramic capacitors, which are prepared by sintering the compositions according to the present invention in an oxidizing atmosphere followed by heating in a reducing atmosphere in order to liberate some amount of oxygen from the ceramic bodies and render then semiconductive, painting the surfaces of the obtained semiconductive ceramic bodies with silver electrode paste and heating these ceramic bodies in an oxidizing atmosphere to effect simultaneously the plating of the silver electrode, the surface diffusion of the electrode materials and partial reoxidation of the surfaces of the ceramic bodies, have a less value of tan δ, a less temperature dependency of capacitance and a higher insulating resistance vs. the applied voltage than the capacitors provided by the prior arts. Consequently, the semiconducting ceramic capacitors according to the invention may be used in many fields including circuits of high working voltage.

Further, the semiconducting ceramic capacitors according to the present invention suffer from no disadvantages which accompany the conventional reduction-reoxidation type $BaTiO_3$ semiconducting ceramic capacitors and have advantages in that they possess good bias and frequency characteristics and their electrical properties are not influenced by aging. As a consequence, such semiconducting ceramic capacitors may also be suited for use in electronic circuits.

In addition, the possibility of direct bonding of lead wires to the surface of electrodes by soldering enhances not only workability in the production of the semiconducting ceramic capacitors and in the assembly of electronic circuits, but also provides good performance and simplification of production when these semiconducting ceramic capacitors are used in miniaturized electric circuits.

What we claim is:

1. A reduction-reoxidation type semiconducting ceramic capacitor comprising a substrate, a pair of silver electrodes plated thereon and a pair of lead wires electrically connected to said electrodes, characterized in that said substrate is an oxygen depletive semiconducting composition consisting essentially of a solid solution of calcium titanate, strontium titanate and a compound represented by the formula $Bi_2O_3.xTiO_2$ ($0.5 \leq x \leq 9.0$) wherein said substrate is made from the following raw material mixture

| | |
|---|---|
| $SrTiO_3$ | 66.0 wt.% |
| $CaTiO_3$ | 27.0 wt.% |

| | |
|---|---|
| $Bi_2O_3 \cdot 3TiO_2$ | 7.0 wt.% | and containing at least one member selected from the group consisting of manganese, cobalt, nickel, chromium, vanadium, niobium, tantalum, lanthanum and cerium ions in total amounts of 0.025 to 0.4% by weight, and combining oxygen on to the surface of said substrate to form an oxidation type dielectric layer thereon.

2. A reduction-reoxidation type semiconducting ceramic capacitor according to claim 1, wherein the substrate is made from the following raw material mixture:

| | |
|---|---|
| $SrTiO_3$ | 66.0 wt.% |
| $CaTiO_3$ | 27.0 wt.% |
| $Bi_2O_3 \cdot 3TiO_2$ | 7.0 wt.% |
| Mn | 0.05 wt.% |

\* \* \* \* \*

UNITED STATES PATENT OFFICE
CERTIFICATE OF CORRECTION

Patent No. 3,995,300     Dated November 30, 1976

Inventor(s) Hitoshi Masumura, et al     Page 1 of 2

It is certified that error appears in the above-identified patent and that said Letters Patent are hereby corrected as shown below:

Column 1, line 10:  Change "according" to --accordance--.

Column 1, line 31:  Change "they" (first occurrence) to --that--.

Column 4, line 26:  Change "faced" to --faces--.

Column 4, line 46:  Change "1 v" to --1 V--.

Column 5, Table II, the last item under "IR : Change "5 x 10" to --5 x $10^4$--.
$(M\Omega)$"

Column 5, line 17:  Change "T.C.(%) = $\Delta C/C_{20}$ x 100=($C_x = C_{100}$)/100" to --T.C.(%) = $\Delta C/C_{20}$ x 100 = ($C_x - C_{100}$)/100 --.

Column 5, line 30:  Change "also," to --Also, --.

Column 5, line 43:  Change "0.5 v" to --0.5 V --.

Column 5, line 56:  Change "ion" to --ions--.

Column 6, line 36:  Change "in" to --is--.

Column 6, line 47:  Change "ion" to --ions--.

Column 7, line 6:  Change "to 85°C" to --to +85°C --.

UNITED STATES PATENT OFFICE
CERTIFICATE OF CORRECTION

Patent No. 3,995,300    Dated November 30, 1976

Inventor(s) Hitoshi Masumura, et al    Page 2 of 2

It is certified that error appears in the above-identified patent and that said Letters Patent are hereby corrected as shown below:

Column 7, line 17:  Change "canadium" to --vanadium--.

Column 7, line 26:  Change "Lz" to --La--.

Column 7, line 49:  Change "whreby" to --whereby--.

Signed and Sealed this ninth Day of August 1977

[SEAL]

Attest:

RUTH C. MASON
*Attesting Officer*

C. MARSHALL DANN
*Commissioner of Patents and Trademarks*